United States Patent
Zhang et al.

(10) Patent No.: US 10,319,113 B2
(45) Date of Patent: Jun. 11, 2019

(54) METHOD FOR RECOVERING HIGHLIGHTS AND SATURATED REGIONS AND EXTENDING DYNAMIC RANGE IN A DIGITAL IMAGE

(71) Applicant: Foveon, Inc., San Jose, CA (US)

(72) Inventors: Jiashu Zhang, Santa Clara, CA (US); Shrinath Ramaswami, San Jose, CA (US); Ion Uehara, Kanagawa (JP)

(73) Assignee: Foveon, Inc., San Jose, CA (US)

( * ) Notice: Subject to any disclaimer, the term of this patent is extended or adjusted under 35 U.S.C. 154(b) by 0 days.

(21) Appl. No.: 15/629,649

(22) Filed: Jun. 21, 2017

(65) Prior Publication Data

US 2018/0374240 A1    Dec. 27, 2018

(51) Int. Cl.
| | |
|---|---|
| *G06K 9/00* | (2006.01) |
| *G06T 7/90* | (2017.01) |
| *G06T 5/00* | (2006.01) |
| *G06T 5/20* | (2006.01) |

(52) U.S. Cl.
CPC ............... *G06T 7/90* (2017.01); *G06T 5/002* (2013.01); *G06T 5/009* (2013.01); *G06T 5/20* (2013.01); *G06T 2207/10024* (2013.01); *G06T 2207/20208* (2013.01)

(58) Field of Classification Search
CPC . G06T 2207/10024; G06T 2207/20208; G06T 2207/20182; G06T 2207/30168; G06T 5/001; G06T 5/002; G06T 7/90; G06K 9/00234

See application file for complete search history.

(56) References Cited

U.S. PATENT DOCUMENTS

| | | |
|---|---|---|
| 2012/0294527 A1 | 11/2012 | Lukac et al. |
| 2013/0321679 A1 | 12/2013 | Lim et al. |
| 2015/0256760 A1 | 9/2015 | Ju et al. |
| 2016/0352975 A1* | 12/2016 | Kervec ............... H04N 1/6027 |
| 2016/0366386 A1* | 12/2016 | Douady-Pleven .... G06T 3/4015 |

OTHER PUBLICATIONS

"International Search Report and Written Opinion", PCT /US2018/ 038348, dated Oct. 4, 2018.

\* cited by examiner

*Primary Examiner* — Euengnan Yeh
(74) *Attorney, Agent, or Firm* — Glass and Associates; Kenneth Glass; Kenneth D'Alessandro

(57) ABSTRACT

A method for performing restoration for highlights and saturated regions in a digital image includes analyzing the pixels in the image and compensating an appropriate amount to identified highlights and saturated pixels. For a pixel with vertical color channels, the output for each channel is highly correlated, and each color channel can be recovered as a combination of the other channels. Each selected pixel in the highlights or saturated regions is identified as a restorable pixel only if at least two color channels of the pixel are not saturated. For each restorable pixel, a replacement pixel value is generated by using the equation derived from the color channels correlation. For pixels where more than one color channel is saturated, the similarity is calculated between these pixels and restored pixels. These pixels can be compensated using the combination of the similarity index and the pixel values of other color channels.

7 Claims, 5 Drawing Sheets

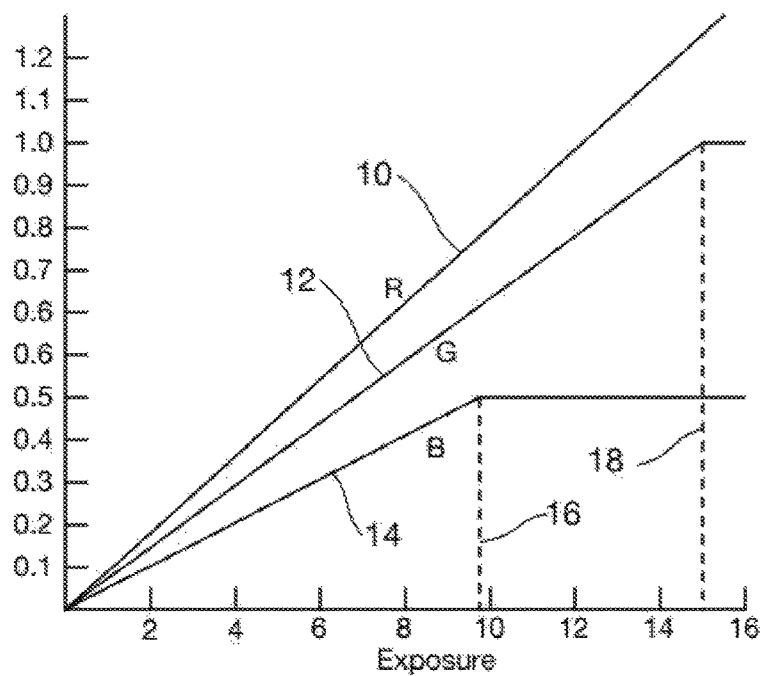
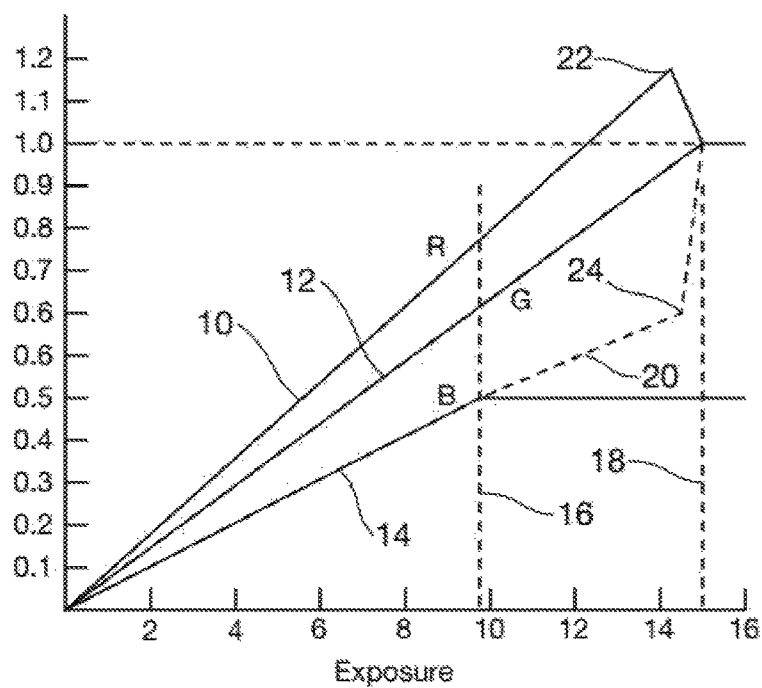

METHOD FOR RECOVERING HIGHLIGHTS AND SATURATED REGIONS AND EXTENDING DYNAMIC RANGE IN A DIGITAL IMAGE

BACKGROUND

The present invention relates to processing of digital images. More particularly, the present invention relates to methods for processing the highlights and saturated regions in a digital image to perform highlights restoration and dynamic range extension.

When one or more color channels in a pixel is close to saturation, the relative values of red, green and blue are no longer accurate. To correct the highlights and saturated regions, digital manufacturers usually apply color desaturation or neutralization. The level of such neutralization usually reduces with the increased distance of the pixel value from the saturation level to minimize the neutralization effect on non-saturated pixels. Since such correction methods affect both the color information and the dynamic range of the image, a different solution is needed.

BRIEF DESCRIPTION

The present invention is an efficient method for processing highlights and saturated regions in a digital camera image. Highlights refer to the pixels having one or more channels close to saturation level. In other words, highlights can be defined as non-saturated pixels having outputs above a certain level in one or more channels. Saturated regions refer to pixels having one or more channels saturated.

The method provides methods to correct: (1) the highlight pixels which are close to saturation, (2) pixels having one channel saturated; (3) pixels having two channels saturated which are similar to the pixels in (2). This will cover pixels that are clipped by the image sensor when it saturates and/or due to image processing. Correcting highlights and saturated pixels avoids color artifacts, and extends the dynamic range in the output image.

In a sensor having vertically aligned pixel color channels, the outputs of the color channels are highly correlated. According to the present invention, one method for performing highlights restoration on a digital image includes white balancing the highlights, setting the saturation value to the saturation value of a color channel having intermediate gain, transitioning the colors having the fastest and slowest gains to the set saturation value, and applying a color correction matrix and clipping the value to 1 if necessary.

According to the present invention, another method for performing highlights restoration on a digital image includes predicting pixel values in the highlights and saturated regions by compensating an appropriate amount based on the color channel correlation. Therefore, the collected red, green and blue pixel information can be used to predict the value of one specific color channel when the values of the other two color channels are known. For example, the red can be mathematically expressed as the combination of the green and blue channel output. This correlation equation can be linear or non-linear, or any other presentation. The original pixel value is then replaced by the predicted pixel. In such processing, the artifacts in the highlight region or the saturated pixels will be reduced. In addition, the dynamic range will also be extended, since the restored pixel value can be even higher than the saturation/clipping level associated with that color. These corrected pixels are marked in a dynamic range extension (DRE) map.

A pixel having two saturated color channels is referred as a highly saturated pixel. A searching window is then generated having the highly saturated pixel at its center. Within this window, all the neighboring pixels which are marked in the DRE map are used to calculate the similarity between the neighboring pixels and the center pixel. For example, the similarity can be calculated as the intensity difference. It also can be calculated by comparing the difference in RGB space, or LUV space, or any representation in other color spaces. The similarity quantitatively indicates how similar the highly saturated pixel is to the DRE pixels. If the similarity reaches a threshold value, then the highly saturated pixel is corrected by replacing one of its saturated color channels using the aforementioned highlights restoration method. This correction reduces the artifact in the uniform highlights and saturated regions where the highlights were partially recovered.

BRIEF DESCRIPTION OF THE DRAWING FIGURES

The invention will be explained in more detail in the following with reference to embodiments and to the drawing in which are shown:

FIG. 1 is a graph of pixel charge accumulation as a function of time showing saturation of individual colors;

FIG. 2 is a graph showing the effect of extended dynamic range on saturation of individual colors;

DETAILED DESCRIPTION

Figure 3:
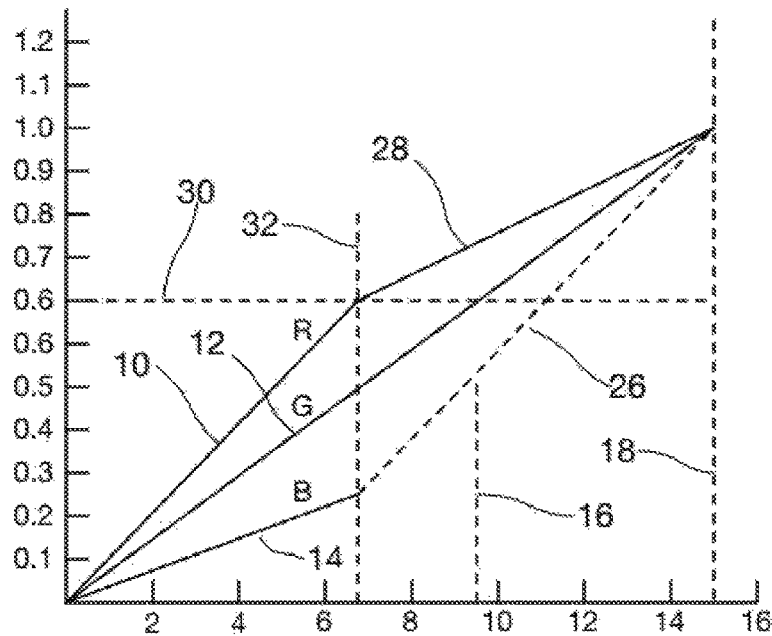
FIG. 3 is a graph showing the effect of extended dynamic range on saturation of individual colors in accordance with one aspect of the present invention.

Persons of ordinary skill in the art will realize that the following description of the present invention is illustrative only and not in any way limiting. Other embodiments of the invention will readily suggest themselves to such skilled persons.

Referring first of all to FIG. 1, pixel behavior is shown in a vertical color pixel such as ones fabricated by Foveon, Inc., assignee of the present invention, under the trademark X3. The color pixel includes three sensors, red, green, and blue. FIG. 1 shows pixel charge accumulation as a function of time for the red pixel 10, the green pixel 12, and the blue pixel 14. The x-axis of FIG. 1 is exposure time expressed in arbitrary units showing a portion of the scale where the imager produces output. The y-axis is output level normalized to a value of "1".

In FIG. 1, it can be seen that the blue pixel (curve 14) saturates first at a time indicated by dashed line 16, and the green pixel (curve 12) saturates at a later time indicated by dashed line 18. The red pixel does not saturate within the time depicted on the x-axis of FIG. 1.

Accordingly, persons of ordinary skill in the art will appreciate that exposure times longer than about the position on the x-axis at dashed line 16 produce an image having color balance distortion due to the saturation of the blue pixel. Thus, exposure times longer than the time at about dashed line 16 do not produce useful images without color correction, resulting in a waste of the potential portion of the dynamic range of the vertical color pixel for times longer than about the position on the x-axis at dashed line 16.

In accordance with the present invention, methods are provided to extend the headroom for all the three-color channels in the vertical color pixel. The present invention includes no clipping in the pre-processing, predicting the amplitude of the signal from the saturated channel, and highlight neutralization to avoid color artifacts.

The present invention takes advantage of the fact that the red, green, and blue color channels of a vertical color imager such as the Foveon X3 imager are highly correlated. By applying the methods of the present invention, the saturated color signal (in this case the blue channel) can be calculated from the values of the other two remaining unsaturated color signals. According to one aspect of the present invention, the value of a saturated channel can be inferred from the values of two unsaturated channels by linear or non-linear fitting. For example, a quadratic equation fitting to the saturated channel can be estimated as:

Estimate $b$ from $g$ and $r$:$g/b = x_1(r/g)^2 + y_1(r/g) + z_1$

Estimate $g$ from $b$ and $r$:$g/b = x_2(r/b)^2 + y_2(r/b) + z_2$

Estimate $r$ from $g$ and $b$:$r/g = x_3(g/b)^2 + y_3(g/b) + z_3$

The constants x, y, and z will vary in individual applications and can be derived from, for example, color checkers or other color images with reduced noise. The noise reduction can be done using any noise removal filters. Therefore, this image will provide accurate color distribution. The color correlation derived from the color checkers will be stored as back-up, in case the noise-reduced color image does not have enough non-saturated pixels to estimate the fitting equations. The effect of the present invention is shown by the dashed line 20 indicated at reference numeral 20 in FIG. 2.

Referring now to FIG. 2, pixel behavior of the three-color imager of FIG. 1 as a function of exposure time after correction of the saturated blue pixel by inferring its value from the values of the unsaturated red and green pixels. As can be seen from FIG. 2, correction using this method is only possible until the exposure time 18 at which the green pixel saturates, after which only the red pixel remains unsaturated.

From an examination of FIG. 2, it can be seen that the dynamic range of the three-color vertical color pixel can be extended to the point indicated at dashed line 18 where the green color 12 starts to saturate. As can be seen from an examination of FIG. 2, the gains of the red and blue pixels 10 and 14 are normalized starting at points 22 and 24 respectively, to converge with the value of the green pixel 12 right before saturation. This forms a smoother highlight transition and avoids color reversals after application of a color correction matrix. Persons of ordinary skill in the art will appreciate that color distortions can result at exposure times longer than the times at points 22 and 24 at which the gain adjustment of the red and blue pixels 10 and 14 is commenced.

Referring now to FIG. 3, pixel behavior of the three-color imager of FIG. 1 as a function of exposure time after correction of the saturated blue pixel by inferring its value from the values of the unsaturated red and green pixels and transitioning the fastest color (red in this case) and the slowest color (blue in this case) to the saturation value of green. In the example shown in FIG. 3, the red channel transitioning threshold is set at the red signal value of 60% as shown by horizontal dashed line 30, occurring at the exposure time indicated by vertical dashed line 32, after which the gain of the red channel is reduced to intersect the green signal at the green saturation value (dashed line 18) normalized to a value of "1". The blue channel gain transitioning point is selected to coincide with the red gain transitioning point at dashed line 32, after which the gain of the blue channel is increased so that it also intersects the green signal at the normalized green saturation value (dashed line 18). Persons of ordinary skill in the art will recognize that this transitioning threshold can be chosen to be anywhere from about 18% to about 80%, the maximum to be chosen in order to avoid abrupt color changes. This will likely be different for different imagers.

Figure 4:
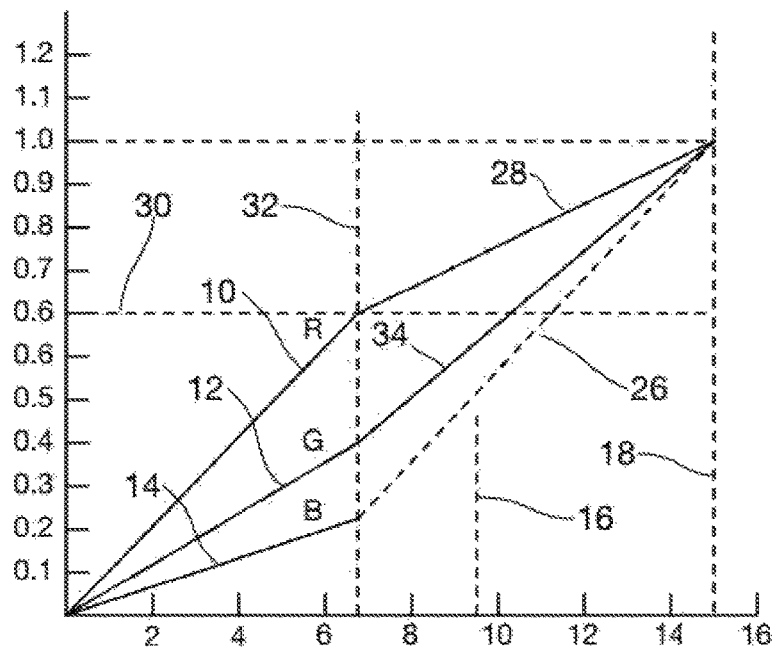
FIG. 4 is a graph showing the effect of extended dynamic range on saturation of individual colors in accordance with one aspect of the present invention after application of a color correction matrix.

FIG. 4 is a graph that shows pixel behavior of the three-color imager of FIG. 1 to which the correction in FIG. 3 has been applied and following color correction matrix (CCM) processing. The CCM processing results in reduction of the green channel signal gain up until the transitioning time shown at dashed line 30, after which the green channel signal gain is increased to intersect its normalized saturation point.

Figure 5:
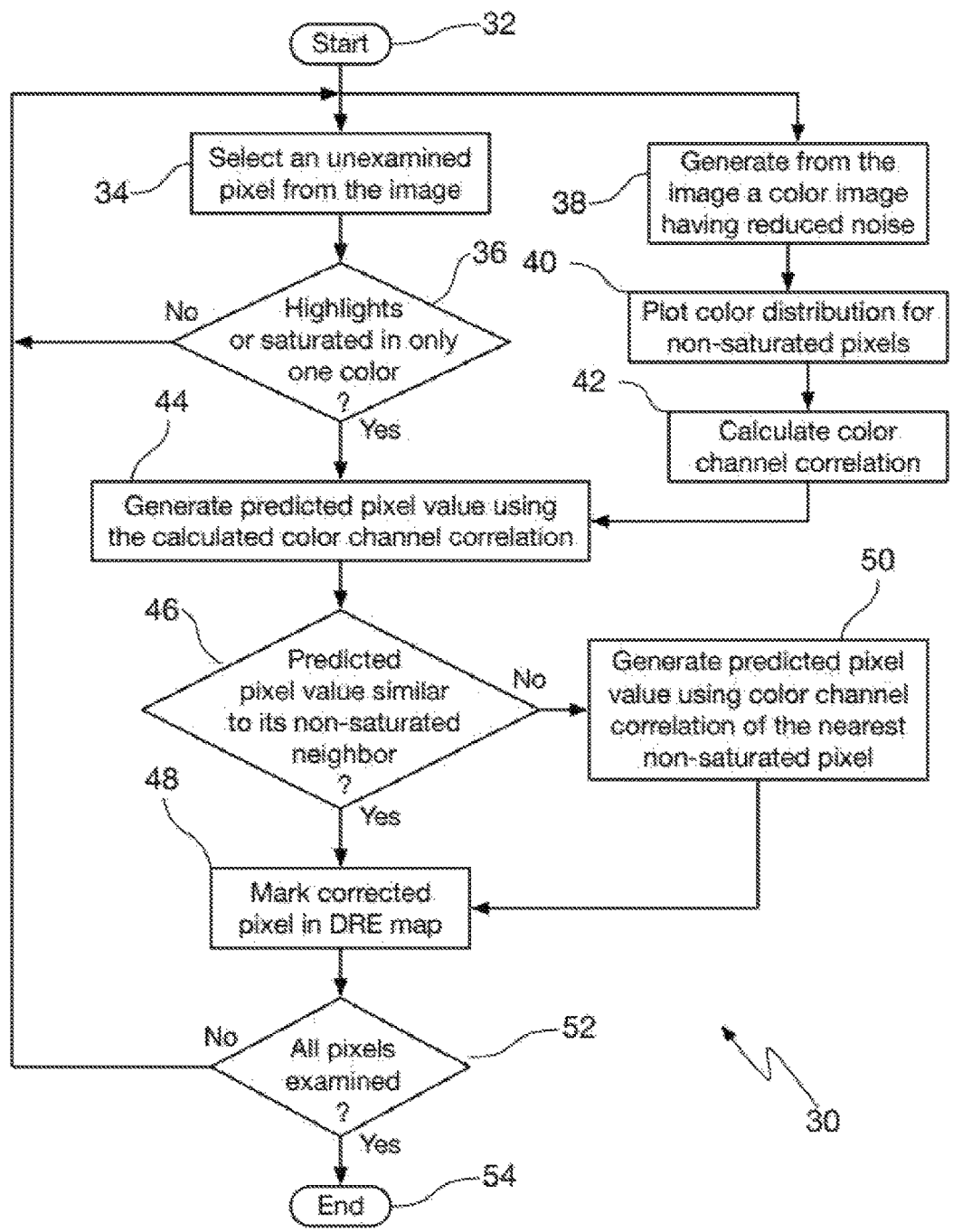
FIG. 5 is a flow diagram depicting a method in accordance with one aspect of the present invention where a single channel has highlights or is saturated.

Referring now to FIG. 5, a flow diagram illustrates a method 30 according to an aspect of the present invention for processing an image to compensate for a single highlight value or saturated color in a vertical color pixel sensor. The method begins at reference numeral 32.

At reference numeral 34, a vertical color pixel is selected from the image for examination. At reference numeral 36 it is determined whether the pixel contains a single color that has highlight values or is saturated. The saturation value for each color of any given three-color vertical pixel sensor is a known characteristic of the sensor. According to this method, "highlights" refer to a pixel where none of the three channels is saturated, but at least one channel produces a very high digital number close to its saturation level. When any of the three channels is close to saturation (e.g., about 90% of the clipping value), its output is probably no longer linear and the output value is not reliable so it is designated as a highlight pixel. A pixel is "saturated" when at least one of the three-color channels has an output value at or above its saturation level making the signal value unreliable.

Meanwhile, at reference numeral 38, a noise reduced color image is generated. This image may be, for example, a color checker image with reduced noise. A downsampled image may also be generated. The noise in the color image can be removed using any noise filters. At reference numeral 40, a color distribution for non-saturated/non-highlight pixels is plotted. At reference numeral 42, the correlation between the color channels is calculated.

If at reference numeral 36 it was determined that the output of only one of the colors in the selected pixel is not at a highlight value or is saturated, the method returns to reference numeral 34 and another pixel is selected. In this case, the pixel is non-saturated, or non-highlight, or it has more than one channel saturated. If the output of only one of the colors in the selected pixel is at a highlight value or is saturated, the method proceeds to reference numeral 44, where the predicted pixel value of the saturated or highlight pixel is generated using the derived color channel correlation. At reference numeral 46, the predicted pixel is examined to see whether its color correlation is similar to its nearest non-saturated neighbors. The examination is done by calculating the difference between the selected pixel and the neighboring non-saturated pixels. If the difference is not larger than a threshold, the predicted pixel value generated at reference numeral 44 is used, and the process proceeds to reference numeral 48 where the corrected pixel is marked in a dynamic range extended (DRE) map.

If, at reference numeral 46 it is determined that the difference is larger than the selected threshold, the process proceeds to reference numeral 50, where a predicted pixel value is generated using the color channel correlation of the nearest non-saturated neighbor. Generating the predicted pixel value in this manner aims to avoid the color artifact that results when the derived color correlation is different from the local neighbors. The process then proceeds to reference numeral 48 where the corrected pixel is marked in a dynamic range extended (DRE) map.

At reference numeral 52, it is determined if all of the pixels in the image have been examined. If not, the method returns to reference numeral 34 and another pixel is selected for examination. If all of the pixels in the image have been examined, the method ends at reference numeral 54.

Figure 6:
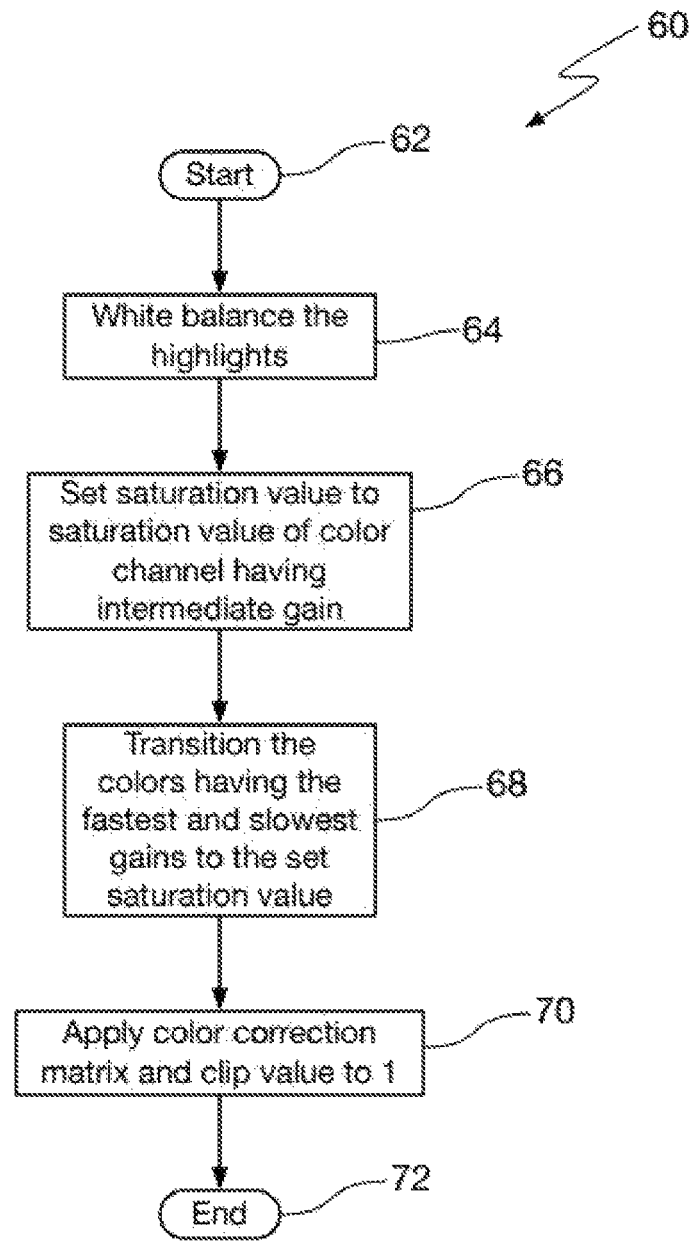
FIG. 6 is a flow diagram depicting a method in accordance with another aspect of the present invention.

Referring now to FIG. 6, a flow diagram illustrates a method 60 for producing the pixel exposure corrections shown in FIG. 3 and FIG. 4. The method begins at reference numeral 62.

At reference numeral 64, the highlights are white balanced. At reference numeral 66 the saturation value is set to the saturation value of the one of the color channels having the intermediate gain of the three color channels. In the non-limiting examples used herein to disclose the present invention, that color is green. At reference numeral 68, the color channels having the fastest and slowest gains are transitioned to the set saturation value. At reference numeral 70, a color correction matrix is applied to the pixel values and the values are clipped to a value of "1" if necessary. The method ends at reference numeral 72.

Figure 7:
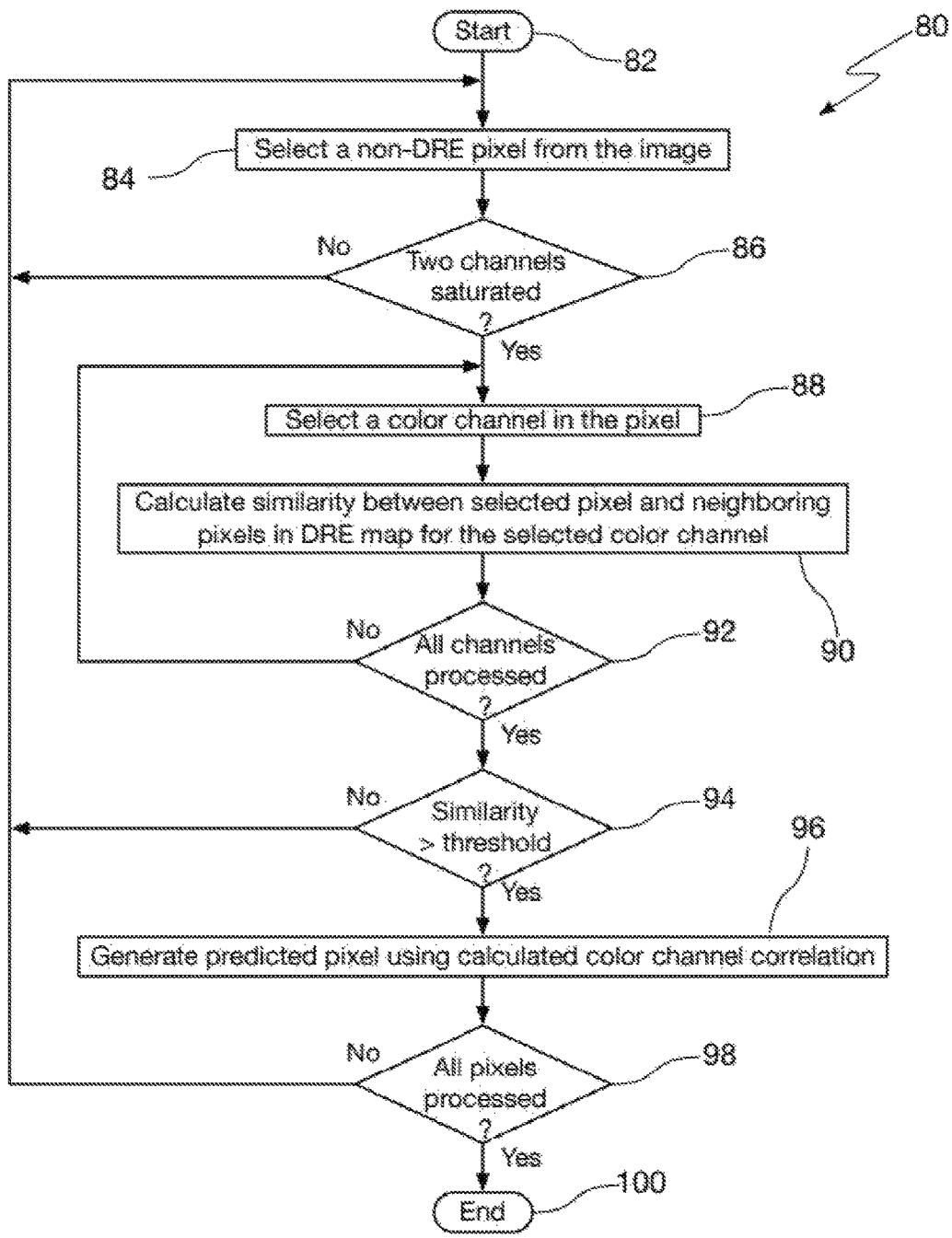
FIG. 7 is a flow diagram depicting a method in accordance with another aspect of the present invention for extending dynamic range of a vertical color imager where more than one channel has highlights or is saturated.

Referring now to FIG. 7, a flow diagram illustrates a method 80 according to an aspect of the present invention for processing an image to compensate for a more than one highlight value or saturated color in a vertical color pixel sensor. The method begins at reference numeral 82.

At reference numeral 84, a pixel not included in the DRE map created at reference numeral 46 of FIG. 5 is selected. At reference numeral 86 it is determined if the outputs of two of the colors in the selected pixel is at a highlight value or is saturated. If it is determined that the outputs of two of the colors in the selected pixel are not at a highlight value or are saturated, the method returns to reference numeral 84 and another pixel is selected. This determination can result if no color in the pixel has an output that is not at a highlight value or is saturated, in which case the pixel does not need any correction, or if all three of the colors in the pixel are at a highlight value or are saturated, a condition for which the color channel outputs of the pixel cannot be corrected.

If the outputs of two of the colors in the selected pixel are at highlight values or are saturated, the method proceeds to reference numeral 88, where one of the color channels in the pixel is selected. At reference numeral 90, the similarity between the selected pixel and neighboring pixels in the DRE map is calculated for the selected color channel. A searching window is generated having the highly saturated pixel at its center. Within this window, all the neighboring pixels which are marked in the DRE map are used to calculate the similarity between the neighboring pixels and the center pixel. The similarity can be calculated, for example, as the intensity difference. It also can be calculated by comparing the difference in RGB space, or LUV space, or any representation in other color spaces. The similarity quantitatively indicates how similar the highly saturated pixel is to the DRE pixels. If the similarity reaches a threshold value, then the highly saturated pixel is corrected by replacing one of its saturated color channels using the aforementioned highlights restoration method. The method then repeats the processes described in reference numerals 88 and 90 until it is determined at reference numeral 92 that all color channels of the selected pixel have been processed.

At reference numeral 94 it is determined if the similarity calculated between the selected pixel and the neighboring pixels is above the threshold. The threshold is a percentage of color difference, and can be estimated from a few example images. If not, the method returns to reference numeral 84 where another pixel not included in the DRE map created at reference numeral 46 of FIG. 5 is selected. If so, the method proceeds to reference numeral 94 where the derived color channel correlation is used to generate predicted pixel values for the two saturated or highlight colors.

The method then proceeds to reference numeral 98, where it is determined if all of the pixels not included in the DRE map created at reference numeral 46 of FIG. 5 have been processed. If not, the method returns to reference numeral 84 where another pixel not included in the DRE map created at reference numeral 46 of FIG. 5 is selected. If so, the method ends at to reference numeral 100.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for recovering highlights and saturated regions and extending dynamic range in a digital image comprising:
   generating from the digital image a color image having reduced noise;
   plotting a color distribution for non-saturated pixels;
   calculating color channel correlation;
   selecting an unexamined pixel from the digital image;
   determining whether the selected pixel contains a single color that has a highlight value or is saturated;
   if the selected pixel is not saturated, or does not have highlight values, or is saturated in more than one color selecting another unexamined pixel from the image and if the selected pixel is saturated in only one color generating a predicted pixel value using the calculated color channel correlation;
   determining whether the predicted pixel value is similar to a non-saturated neighboring pixel;
   if the predicted pixel value is similar to a non-saturated neighboring pixel substituting the predicted pixel value for the highlight value or saturated value in the selected pixel and marking the selected pixel as corrected in a dynamic range extension map of the digital image;
   if the predicted pixel value is not similar to a non-saturated neighboring pixel generating a second predicted pixel value using color channel correlation of the nearest non-saturated pixel, substituting the second predicted pixel value for the highlight value or saturated value in the selected pixel and marking the selected pixel as corrected in a dynamic range extension map of the digital image;
   if all pixels in the digital image have been examined, terminating the method; and if all pixels in the digital image have not been examined, selecting an unexamined pixel from the image.

2. The method of claim 1 wherein generating from the digital image a color image having reduced noise comprises applying a noise filter to the digital image.

3. The method of claim 1 wherein generating from the digital image a color image having reduced noise comprises generating a downsampled image.

4. The method of claim 1, further comprising:
after all pixels saturated in only one color have been examined, selecting a pixel not marked in the dynamic range extension map of the image;
determining whether two color channels of the selected pixel are saturated;
if other than two color channels of the selected pixel are saturated, selecting another pixel not marked in the dynamic range extension map of the image;
if two color channels of the selected pixel are saturated, for each of the two color channels individually calculating similarities between the two color channels of the selected pixel and corresponding color channels of neighboring pixels in the dynamic range extension map of the image;
if the similarities are both above a selected threshold generating a predicted pixel using the calculated color channel correlation;
if all pixels not marked in the dynamic range extension map of the image have been examined, terminating the method; and
if all pixels not marked in the dynamic range extension map of the image have not been examined, selecting an unexamined pixel not marked in the dynamic range extension map of the image.

5. A method for recovering highlights and saturated regions and extending dynamic range in a digital image having at least three color channels comprising:
normalizing values of all pixels in the digital image to 1;
white balancing highlights in the digital image to generate a white balanced image;
in the white balanced image setting a saturation value to a saturation value of one of the color channels that has an intermediate gain when compared to the other color channels;
transitioning the gain of the color channels having gains slower and faster than the color channel having the intermediate gain to the set saturation value;
applying a color correction matrix to the digital image; and
clip to a value of 1 the value of any pixel having a value greater than 1.

6. The method of claim 5 wherein the gain of the color channels having gains slower and faster than the color channel having the intermediate gain to the set saturation value comprises commencing transitioning at a selected pixel amplitude value of the pixel having the gain faster than the color channel having the intermediate gain.

7. The method of claim 6 wherein the selected pixel amplitude value of the pixel having the faster gain than the color channel having the intermediate gain comprises between about 18% and about 80%.

* * * * *